Patented Mar. 28, 1950

2,502,370

UNITED STATES PATENT OFFICE 2,502,370

POLYVINYL CHLORIDE COMPOSITIONS

John Kenneth Craver, Webster Groves, Mo., assignor to Monsanto Chemical Company, St. Louis, Mo., a corporation of Delaware No Drawing. Application March 13, 1947, Serial No. 734,559

9 Claims. (Cl. 260—31.6)

This invention relates to novel compositions comprising vinyl resins containing predominantly polymerized vinyl chloride and pentaerythritol tetrabenzoate. More particularly, this invention relates to polymerized vinyl chloride resin compositions which have reduced fusion temperatures and which compositions show only an insignificant amount of plasticization at ordinary temperatures.

Polyvinyl resins, particularly polyvinyl chloride and the copolymer resins, polyvinyl chloride-acetate formed by the conjoint polymerization of vinyl chloride and vinyl acetate, are normally rigid and brittle in their unplasticized state. Although unplasticized polyvinyl chloride has an indefinite flexibility point of approximately 75 to 80° C., as estimated by the method for determining flexibility points of plastic materials described by Clash and Berg, Ind. Eng. Chem., 34 1218 (1942), the unplasticized resins do not become fused, fluid, pliable, mobile or workable up to temperatures of 165–175° C. where thermal decomposition of the resins is evident. Moreover, because of the fact that these polyvinyl resins do not have definite fusion points and do not become fluid at temperatures below their decomposition temperatures, the unplasticized resins cannot be processed by roll-milling, extruding, or molding, and particularly, these unplasticized resins cannot be used as the materials for injection molding techniques.

To overcome many of these difficulties, it is common practice to intimately mix polyvinyl chloride resins with plasticizing compounds such as dioctyl phthalate, dibutyl sebacate and tricresyl phosphate. These plasticized compositions are easily and readily worked on roll mills, and films and sheets formed therefrom are supple and flexible, these characteristics being highly desirable for many applications. These compositions may also be readily molded or extruded, although these molded or extruded articles possess a softness, flexibility or non-rigidity, which are undesirable properties for many molded articles.

It is an object of this invention to provide polyvinyl chloride compositions, and compositions of vinyl resins containing predominantly polyvinyl chloride, having reduced fusion points and, therefore, become fused and fluid upon heating. Thus these new compositions may be readily milled, molded or extruded, but these compositions, when cooled to ordinary temperatures, have the rigidity, hardness and other appearances of the unplasticized polymerized vinyl resin.

I have discovered that when a composition is prepared comprising polyvinyl chloride and pentaerythritol tetrabenzoate or polyvinyl chloride-acetate and pentaerythritol tetrabenzoate, the pentaerythritol tetrabenzoate acts to reduce the fusion temperature of the polyvinyl chloride resins and the composition fuses and becomes mobile, viscous or fluid at the usual milling and molding temperatures of 110° to 150° C. Moreover, upon cooling to ordinary temperatures the compositions become hard, rigid, tough, non-extensible and have all the appearances of an unplasticized polyvinyl chloride resin and indicate only an insignificant amount of plasticization by the pentaerythritol tetrabenzoate.

The invention thus provides for the fabrication of hard, rigid and solid articles from polyvinyl chloride resins. Thus, a composition comprising a polyvinyl chloride resin and pentaerythritol tetrabenzoate may be worked smoothly and easily upon a differential-speed, two-roll mill while in a fluxed and fused state, and yet, upon removing the sheet from the roll mill and cooling it to room temperature, there will result a hard, boardy, non-extensible and rigid sheet which will exhibit practically no evidence of plasticization. In addition, this discovery facilitates the use of injection molding techniques to form, from polyvinyl chloride resins, hard, rigid and fracture resistant molded articles of intricate design and sharp impression, since the fluid composition comprising the polyvinyl chloride resin and pentaerythritol tetrabenzoate fills the crevices and intricacies of the mold in a manner which is not obtainable with unplasticized polyvinyl chloride, but yet, the finished article has all the appearances and most of the properties of an unplasticized polyvinyl chloride resin, particularly, hardness and rigidity.

This invention is particularly applicable to polymerized vinyl chloride resins and to resins formed by the conjoint polymerization of vinyl chloride with other materials such as vinyl acetate, vinyl propionate, vinylidine chloride, methyl methacrylate or diethyl maleate, preferably when vinyl chloride comprises at least 85% of the copolymer resin.

The pentaerythritol tetrabenzoate may be incorporated into the vinyl resin compositions in amounts up to 40% by weight of the composition. However, a composition containing 10 to 35% by weight of pentaerythritol tetrabenzoate and preferably 15 to 30% by weight, is desirable for most purposes. In the plasticized resin art the plasticizer content of a resinous composition is more frequently expressed on the basis of parts by weight of plasticizer per 100 parts of resin. According to this mode of expression, the above expressed percentage compositions, approximate 10 to 55 parts by weight of pentaerythritol tetrabenzoate per 100 parts of resin and preferably 20 to 45 parts by weight of pentaerythritol tetrabenzoate per 100 parts of resin as compositions being desirable for most purposes. The pentaerythritol tetrabenzoate may also be used in conjunction with compositions containing polymerized vinyl chloride and conventional plasticizers, however, these compositions containing pentaerythritol tetrabenzoate will have properties evidencing plasticization to the extent of the conventional plasticizer employed.

Other pentaerythritol derivatives were investigated in connection with this invention, and all acted to produce rubbery, supple or flexible compositions when the pentaerythritol compounds were present in sufficient amounts to facilitate milling or molding operations.

For example, a composition containing 80% polyvinyl chloride and 20% pentaerythritol tetra acetate, when worked on a roll mill until a homogeneous composition is formed, produces a sheet which is flexible at normal temperatures. In a similar manner, a composition containing 70% polyvinyl chloride and 30% pentaerythritol diacetate-dipropionate gives a flexible sheet at normal temperatures. A composition was prepared containing 30% pentaerythritol tribenzoate and 70% polyvinyl chloride and the result was a flexible sheet at room temperature.

The following examples illustrate the advantageous and unexpected results to be achieved by the use of the compositions of this invention, but it is not intended that this invention be limited to applications illustrated by the examples.

Example I 100 parts by weight of a polymerized vinyl chloride resin were intimately mixed with 25 parts by weight of pentaerythritol tetrabenzoate, and the mixture was worked on a differential-speed two-roll mill, wherein the temperature of one roll was maintained at 160° C. and the other roll at 145° C., until a homogeneous composition was formed. At this milling temperature, the pentaerythritol tetrabenzoate caused the polymerized vinyl chloride resin to flux, and work very easily and smoothly on the rolls. A sheet was removed from the rolls and cooled to room temperature.

At room temperature, the finished sheet was hard, tough, boardy and rigid and had all the appearances of an unplasticized polyvinyl chloride composition.

The flexibility point was determined and was found to be about +53° C.

This example illustrates the action of the pentaerythritol tetrabenzoate in lowering the fusion point of polyvinyl chloride resins. However, the high temperature at which the composition becomes flexible indicates that pentaerythritol tetrabenzoate at ordinary temperatures has but a very slight plasticizing action on polyvinyl chloride resins, and the compositions at normal temperatures will be rigid.

Example II 100 parts by weight of a polymerized vinyl chloride resin were intimately mixed with 43 parts by weight of pentaerythritol tetrabenzoate, and the mixture was blended and fluxed on a differential-speed, two-roll mill, wherein the temperature of one roll was maintained at 150° C. and the other roll at 130° C., until a homogeneous composition was formed. The pentaerythritol tetrabenzoate caused the polymerized vinyl chloride resin to fuse at this milling temperature and work very easily and smoothly on the rolls. A sheet was removed from the rolls and cooled to room temperature.

At room temperature, the finished sheet was hard, tough, boardy and rigid and exhibited properties which were substantially the same as an unplasticized polyvinyl chloride resin.

The flexibility point was determined and was found to be about +48° C.

This example illustrates the action of the pentaerythritol tetrabenzoate in lowering the fusion point of polyvinyl chloride resins. However, the high temperature at which the composition containing 30% pentaerythritol tetrabenzoate becomes flexible indicates that pentaerythritol tetrabenzonate at ordinary temperatures has but a very slight plasticizing action on polyvinyl chloride resins, even when present to the extent of 30% of the composition.

Example III 100 parts by weight of a polyvinyl chloride resin formed by the copolymerization of vinyl chloride and vinyl acetate wherein the vinyl chloride comprises 90% by weight of the copolymer resin, were intimately mixed with 54 parts by weight of pentaerythritol tetrabenzoate and the mixture was fused and worked on a differential-speed, two-roll mill wherein one roll was maintained at a temperature of 140° C. and the other roll at 125° C., until a homogeneous composition was formed. At this milling temperature the pentaerythritol tetrabenzoate caused the copolymer vinyl chloride-acetate resin to flux and become mobile on the rolls. The sheet was removed from the rolls and cooled to room temperature. At room temperature this finished sheet comprising approximately 35% pentaerythritol tetrabenzoate and 65% of the copolymer vinyl chloride-acetate resin was hard, boardy and rigid. The flexibility point was approximately 46° C. but in other respects the sheet appeared to be an unplasticized polymerized vinyl resin.

Example IV 100 parts by weight of polymerized vinyl chloride and 43 parts by weight of pentaerythritol tetrabenzoate were mixed together and heated to 150° C. in a heated mixing machine until the mixture fluxed and a homogeneous composition was formed. This mobile composition was then transferred to an injection molding machine, heated to approximately 160° C. and was then formed by means of an injection molding technique into an article in the shape of a golf tee.

Upon cooling and removing the golf tee from the mold, it was found to be very rigid, hard and fracture resistant and appeared to be an article molded from unplasticized polyvinyl chloride. Moreover, the designs and inscriptions of the mold were sharply and perfectly formed upon the golf tee.

Example V 100 parts by weight of a vinyl resin formed by the copolymerization of vinyl chloride and vinylidine chloride wherein the vinyl chloride comprises 85% by weight of the copolymer resin, were intimately mixed at 150° C. with 54 parts by weight of pentaerythritol tetrabenzoate until the mixture fused and a homogeneous composition was formed. The composition was cooled and a molding powder prepared therefrom. The powdered composition was placed in a pressure molding apparatus, heated to approximately 160° C. and formed into an article of the shape of a dumbbell.

Upon cooling and removing the dumbbell from the mold, it was found to be very rigid and hard, and had the apparent characteristics of an article molded from the unplasticized copolymer resin.

I claim:

1. A composition capable of fusing under heat, comprising a polymerized vinyl resin containing at least 85% of combined vinyl chloride, and containing 10 to 55 parts by weight of pentaerythritol tetrabenzoate per 100 parts of said resin.

2. A composition capable of fusing under heat, comprising polyvinyl chloride and 10 to 55 parts by weight of pentaerythritol tetrabenzoate per 100 parts of polyvinyl chloride.

3. A composition capable of fusing under heat, comprising polyvinyl chloride and 20 to 45 parts of pentaerythritol tetrabenzoate per 100 parts of polyvinyl chloride.

4. A composition capable of fusing under heat, comprising a polymerized vinyl resin which is a conjoint polymer of vinyl chloride and vinyl acetate, wherein the vinyl chloride comprises at least 85% of the conjoint polymer, and 10 to 55 parts by weight of pentaerythritol tetrabenzoate per 100 parts of said resin.

5. A composition capable of fusing under heat, comprising a polymerized vinyl resin which is a conjoint polymer of vinyl chloride and vinylidine chloride wherein the vinyl chloride comprises at least 85% of the conjoint polymer, and 10 to 55 parts by weight of pentaerythritol tetrabenzoate per 100 parts of said resin.

6. A method for making solid, hard and rigid compositions containing polymerized vinyl chloride and having relatively low fusing temperatures, comprising intimately mixing 100 parts by weight of a polymerized vinyl resin containing at least 85% of combined vinyl chloride with 10 to 55 parts of a fusion temperature lowering agent consisting of pentaerythritol tetrabenzoate at elevated temperatures above the fusion temperature of the mixture of the vinyl resin and the pentaerythritol tetrabenzoate and below the decomposition temperature of said mixture and thereby forming a fused mixture, cooling said mixture below the softening point of said mixture and thereby forming a solid, hard and rigid composition; said composition being normally and substantially of the same hardness and rigidity as said resin and said composition fusing at a lower temperature than said resin.

7. A method for forming solid, hard and rigid articles of manufacture containing predominantly polyvinyl chloride, comprising fusing polyvinyl chloride with 20 to 45 parts by weight of pentaerythritol tetrabenzoate per 100 parts by weight of polyvinyl chloride at elevated temperatures above the fusion temperature of the mixture of the vinyl resin and the pentaerythritol tetrabenzoate and below the decomposition temperature of said mixture to form a fused mixture, forming said mixture in a predetermined shape and cooling below the softening point of said mixture.

8. A method for making normally solid, hard and rigid articles of predetermined shape and containing polymerized vinyl chloride, comprising intimately mixing 100 parts by weight of a vinyl resin which is a conjoint polymer of vinyl chloride and vinyl acetate wherein the vinyl chloride comprises at least 85% of the conjoint polymer with 20 to 45 parts by weight of a fusion temperature lowering agent consisting of pentaerythritol tetrabenzoate, fusing said mixture, forming said fused mixture in a predetermined shape and causing said mixture to harden in the predetermined shape by cooling below the softening point of said mixture; said article having normally substantially the same hardness and rigidity as said resin and said article having a lower fusion temperature than said resin.

9. A method for forming solid, hard and rigid articles of manufacture from a vinyl resin which is the conjoint polymer of vinyl chloride and vinylidine chloride wherein the vinyl chloride comprises at least 85% of the conjoint polymer, comprising intimately mixing 100 parts by weight of said resin with 20 to 45 parts by weight of a fusion temperature lowering agent consisting of pentaerythritol tetrabenzoate, fusing said mixture, forming said fused mixture in a predetermined shape and cooling below the softening point of said mixture while retained in said predetermined shape; said article having normally and substantially the same hardness and rigidity as said resin and said article having a lower fusion temperature than said resin.

JOHN KENNETH CRAVER.

REFERENCES CITED

The following references are of record in the file of this patent:

UNITED STATES PATENTS

| Number | Name | Date |
| --- | --- | --- |
| 2,381,247 | Barth | Aug. 7, 1945 |